C. WOOD.
APPARATUS FOR TREATING FURNACE SLAG OR SCORIA.
No. 188,763. Patented March 27, 1877.
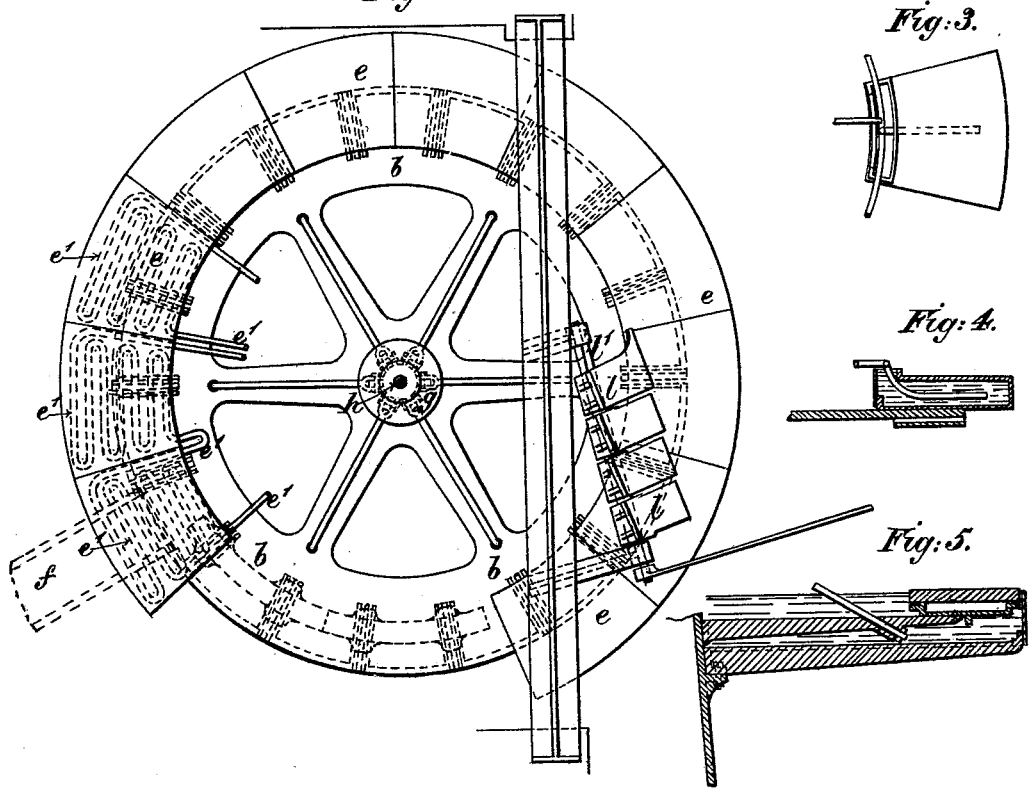
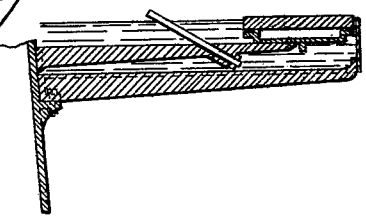
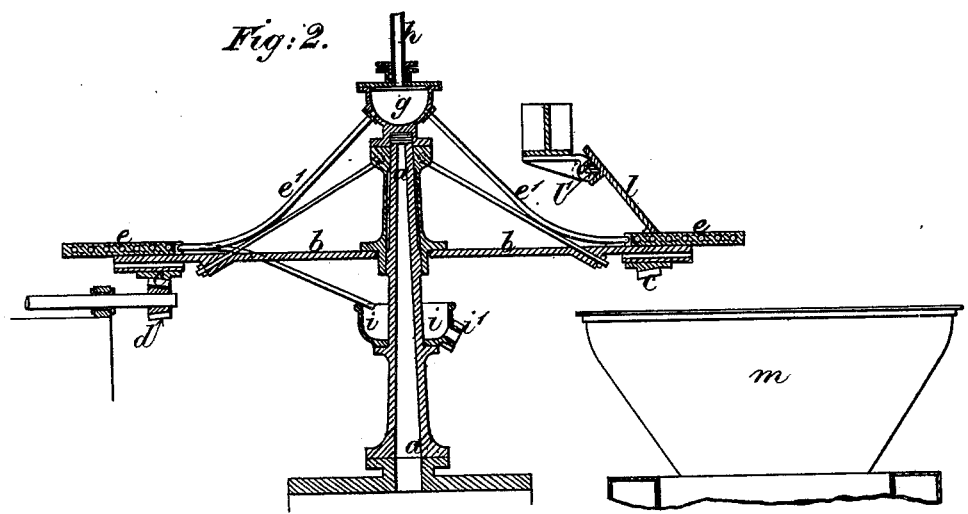
WITNESSES:
INVENTOR:
Charles Wood,
By his Attorneys

UNITED STATES PATENT OFFICE.

CHARLES WOOD, OF MIDDLESBOROUGH-ON-TEES, ENGLAND.

IMPROVEMENT IN APPARATUS FOR TREATING FURNACE SLAG OR SCORIA.

Specification forming part of Letters Patent No. 188,763, dated March 27, 1877; application filed November 9, 1876.

*To all whom it may concern:*

Be it known that I, CHARLES WOOD, of the Tees Iron Works, Middlesborough-on-Tees, in the county of York, England, have invented new and useful Improvements in Apparatus for Treating Furnace Slag or Scoria, which improvements are fully set forth in the following specification, reference being had to the accompanying drawings.

This invention has for its object improvements in the production of shingle (for use in the manufacture of bricks, mortar, cement, and concrete) from furnace slag or scoria.

In order to prepare the slag or scoria for use I employ a machine which spreads and cools it, and reduces it to a state resembling shingle.

The apparatus is composed of a circular table or trough, upon which, near the outside, the slag or scoria falls from the usual runner or spout as it comes out of the furnace, the table or trough revolving at the same time the slag is thus spread upon this table or into this trough in a thin layer. Before the table or trough has completed its revolution, the partially-cooled slag or scoria comes in contact with a fixed shovel or scraper, which removes the slag or scoria from the table or trough, and it then falls over the side into wagons. The shovel or scraper is made so that it can be lifted out of action by a handle. While the wagons are being changed, the table or trough still continuing to revolve, the slag or scoria simply accumulates on the table or trough until all is again ready. If the slag or scoria is not sufficiently cooled by the time it arrives at the shovel or scraper, I run a little water upon it. That part of the table or trough upon which the liquid slag or scoria falls may be hollow, and I keep a current of water flowing through the hollow space to prevent the table or trough getting too hot and cracking. I make this table or trough to revolve by a pinion working into the teeth of a wheel fixed under, or it might be above, the table.

Figure 1 is a plan, and Fig. 2 is a vertical section, of apparatus constructed according to my invention.

*a a* is an axis or central post, and *b b* is a table mounted so as to be able to rotate upon it. The table *b* receives a slow motion by means of the ring of teeth *c*, bolted to its under side, and the driving-pinion *d*, which is in gear with these teeth, or a wheel can be fixed upon the bowl *g* and driven by a pinion. *e e* are cast-iron slabs fixed upon and forming part of the table. The slag is received upon them from the trough *f*, into which it flows from the furnace. The slabs *e* are each cast upon a wrought-iron zigzag pipe, *e'*, and they are cooled when in use by water flowing through these pipes. The water enters the pipes *e'* from the bowl *g*, which is supplied by a pipe, *h*, and the water flows down and escapes into the trough *i*, which has an outlet at *i'*.

To prevent the slag running off the table while it is yet fluid, the table may be provided with a shallow rim on one or both sides, so as to form it into a trough. *l l* are scrapers for removing the cooled slag from the table and pushing it off into the truck *m*. The scrapers are mounted upon a bar, *l'*, and this bar can be turned to lift the scrapers while a loaded truck is removed and replaced by an empty one.

If the table be provided with a fixed rim, forming a trough, the scrapers are so formed as to raise the slag or scoria over this rim, but the plane-surface table is preferred. Small streams of water may be run upon the slag before it is removed from the table, to cool it more completely.

Another way of forming the surface of the table is shown in plan at Fig. 3 and in section at Fig. 4. The part which supports the slag is cast hollow and kept full of water. Or, again, this portion of the table may rotate within a stationary water-trough, as is shown at Fig. 5.

Having thus described the nature of my said invention, and the manner of performing the same, I would have it understood that I claim—

1. The apparatus for producing slag-shingle, such apparatus consisting of a rotating table or trough, receiving, cooling, and conveying away the slag or scoria as it flows from a furnace, and having scrapers combined with it to remove the slag or scoria from its surface, substantially as described.

2. The combination, substantially as hereinbefore set forth, of the rotating trough or table which receives the slag as it flows from the furnace, the water pipes or space beneath the surface of the table, the supply-bowl or water-reservoir, and the pipes for conveying the water therefrom to the table, for the purpose specified.

CHARLES WOOD.

Witnesses:
 JNO. T. BELK, *Notary Public*,
 R. A. JOHNSON, *his Clerk*.